United States Patent [19]
Mizikovsky

[11] Patent Number: 5,228,074
[45] Date of Patent: Jul. 13, 1993

[54] DUAL MODE CELLULAR TELEPHONE APPARATUS

[75] Inventor: Semyon Mizikovsky, Union, N.J.

[73] Assignee: Sony Corporatoin of America, Park Ridge, N.J.

[21] Appl. No.: 684,774

[22] Filed: Apr. 15, 1991

[51] Int. Cl.⁵ .................... H04M 11/00; H04O 7/00; H04B 1/40

[52] U.S. Cl. .................... 379/59; 455/33.1; 455/88

[58] Field of Search .................... 379/59, 60; 455/33.1, 455/54.1, 88

[56] References Cited

U.S. PATENT DOCUMENTS

| | | | |
|---|---|---|---|
| 4,837,800 | 6/1989 | Freeburg et al. | 379/59 |
| 4,870,696 | 9/1989 | Yorita | 379/60 |
| 4,921,464 | 5/1990 | Ito et al. | 455/54.1 |
| 5,029,233 | 7/1991 | Metroka | 455/54.1 |
| 5,119,397 | 6/1992 | Dahlin et al. | 455/33.1 |

Primary Examiner—Curtis Kuntz
Assistant Examiner—Vijay Shankar
Attorney, Agent, or Firm—William S. Frommer; Alvin Sinderbrand

[57] ABSTRACT

Dual mode cellular telephone apparatus for communicating in analog or digital modes. A portable unit adapted to communicate substantially only in an analog mode is operable to transmit voice signals supplied from an audio input to a cellular base station and to couple voice signals received from a cellular base station to an audio output. The portable unit, which is capable of operating as a stand alone device, is connectable to a mobile unit adapted to communicate in both analog and digital modes with the cellular base station. When the units are connected, voice signals pass through the mobile unit to and from the portable unit for communication with the base station. A control unit determines whether the mobile unit operates in an analog mode or a digital mode.

20 Claims, 2 Drawing Sheets

DUAL MODE CELLULAR TELEPHONE APPARATUS

BACKGROUND OF THE INVENTION

1. Field of the Invention

This invention relates to cellular telephone apparatus and, more particularly, to dual mode cellular telephone apparatus capable of operating in both analog and digital modes wherein a portable unit connectable to a mobile unit may communicate with a cellular base station in either mode.

2. Description of the Prior Art

Cellular telephone standards provide particular conventions and formats by which voice signals are communicated between mobile stations and cellular base stations. Typically, communication is carried out in analog form, wherein analog voice signals are modulated onto a carrier and transmitted either from a mobile station to a base station or from a base station to a mobile station. As an example, frequency modulation has been used for such communication.

Conventionally, a mobile station refers to a cellular telephone transmitter/receiver that moves from point to point. Typically, mobile stations are disposed in vehicles, such as automobiles, boats, etc., and rely upon the vehicle source of power to energize the electronics included in the mobile station. Heretofore, the construction of the transmit/receive/processing circuitry, the size of the usual radio antenna used therewith and the reliance on an external source of power have made it difficult to implement a mobile station in truly portable dimensions. Recently, however, advances in electronic miniaturization and improvements in circuit performance have resulted in the introduction of portable, or hand-held, mobile units.

A typical portable mobile unit includes a battery, such as a rechargeable battery, for supplying electrical energy, a microphone for converting audible signals to electrical voice signals, processing, transmitting and receiving circuitry to enable the analog transmission and reception of voice signals, a loudspeaker for converting received voice signals to audible sounds and an antenna, such as a low gain antenna, by which analog voice signals may be communicated between the portable unit and a typical cellular base station. The portable unit also includes displays to apprise the user of different modes of operation, a keypad by which the user may effect a telephone call to a desired party via the cellular communication system, and other ancillary or auxiliary elements. If the battery is of the rechargeable type, suitable external contacts may be provided on the portable unit to facilitate charging of the battery without removal thereof from the unit.

To enhance cellular telephone systems and add capabilities not heretofore exhibited by analog systems, particularly in geographic areas wherein cellular communication traffic is heavy and dense, a dual mode cellular standard, identified as the TIA IS-54 standard, has been introduced. This dual mode standard permits voice signals to be transmitted either in analog form, as before, or in digital form. The application of digital techniques to voice communication improves the quality and fidelity of the transmitted voice signals and increases the number of users which may access the cellular system simultaneously. In addition, the cellular communication system may be used to communicate other information and data and need not be limited solely to voice communication.

In the dual mode cellular standard, a mobile station is controlled to communicate in analog form in the event that the cellular system with which it is used does not exhibit digital communication capabilities, such as in exurban environments, or in the event that all of the digital channels are being used but some analog channels nevertheless are available. At other times, the mobile station is controlled to communicate in digital form. However, to provide dual analog/digital capabilities in a mobile unit generally means that additional circuitry must be provided therein, resulting in large, relatively heavy, bulky apparatus. As a consequence, the dual mode mobile unit no longer is considered portable. That is, the unit no longer is of a size and weight conducive for hand-held operation.

OBJECTS AND SUMMARY OF THE INVENTION

Therefore, it is an object of the present invention to provide dual mode cellular telephone apparatus which enjoys the advantages derived from a dual mode cellular standard, such as TIA IS-54, yet provides the user with the portability he has come to expect from analog cellular telephone equipment.

Another object of this invention is to provide dual mode cellular telephone apparatus wherein digital communication circuitry, which is inherently heavy and bulky, may be located in a vehicle and a portable unit which is relatively small, lightweight and admits of hand-held operation, is connectable to the digital communication circuitry and admits of either stand alone operation or interaction with that digital communication circuitry.

A further object of this invention is to provide dual mode cellular telephone apparatus of the aforementioned type operable in an analog mode as a portable hand-held, self-contained unit, and operable as a user interface when connected to a mobile-based unit having digital communications electronics therein.

Various other objects, advantages and features of the present invention will become readily apparent from the ensuing detailed description, and the novel features will be particularly pointed out in the appended claims.

In accordance with this invention, dual mode cellular telephone apparatus is provided for communicating in analog or digital modes. As used herein, communication in an analog mode is intended to refer to conventional analog modulation of voice signals, such as analog FM modulation. Communication in a digital mode is intended to refer to a digital format and convention defined by a cellular standard, such as the TIA IS-54 standard. The present invention is not concerned per se with the digital processing of voice or data signals, which is described in the aforementioned standard and, therefore, further description herein is not provided. It will be appreciated, however, that the digital processing includes VSELP voice coding, delay interval compensation, channel coding, error correction, etc., all as described in greater detail in the aforementioned standard. Furthermore, it will be appreciated that a voice signal refers to a voice frequency signal and may represent speech information or other data that has been converted or modulated to voice frequency.

The apparatus of the present invention includes a portable unit for communicating substantially only in an analog mode and operable to transmit voice signals supplied from an audio input, such as a microphone, to a cellular base station and to couple voice signals received from a cellular base station to an audio output, such as a speaker. A mobile unit, such as a unit intended to be disposed in a vehicle (e.g. an automobile, a boat, a train or other means of conveyance), is adapted to communicate in both analog and digital modes with a cellular base station. The mobile unit is connectable to the portable unit, and a controller is responsive to the connection of these units for transmitting voice signals from the audio input of the portable unit to the cellular base station via the mobile unit and for coupling voice signals received in analog or digital mode from the cellular base station to the audio output of the portable unit via the mobile unit. The particular mode which is adopted is determined by the cellular base station, as by the transmission of suitable control signals to the controller.

As one aspect of this invention, the portable unit is usable as a stand alone device to communicate in an analog mode with the cellular base station and the mobile unit is operable either in an analog mode or a digital mode. When the portable unit is connected to the mobile unit, the transmitting and receiving circuitry in the portable unit, such as the RF circuitry included therein, is not used. Rather, RF circuitry provided in the mobile unit is used to receive voice signals from and to transmit voice signals to the base station. However, the usual analog modulator and demodulator provided in the portable unit are used when the mobile unit operates in its analog mode but not when the mobile unit operates in its digital mode.

In one embodiment of this invention, controllable switching devices are provided to select portions of the portable unit and portions of the mobile unit for communicating with the base station during analog or digital modes.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
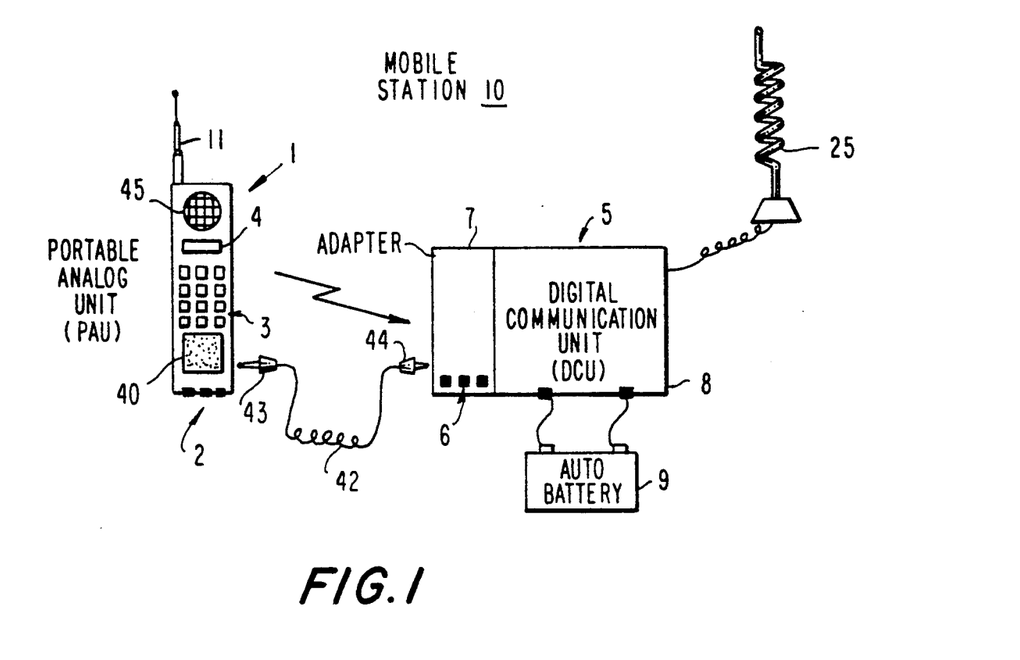
FIG. 1 is a schematic representation of dual mode cellular telephone apparatus in accordance with the present invention.

Referring now to the drawings, wherein like reference numerals are used throughout, FIG. 1 is a schematic representation of dual mode cellular telephone apparatus which incorporates the present invention. This apparatus is intended to be disposed in a mobile station 10 of the type normally used in a vehicle, such as an automobile, a boat, a train or other means of conveyance. Mobile station 10 is comprised of a portable unit 1 that is physically and electrically connectable to a mobile unit 5. Portable unit 1 includes analog modulating-/demodulating circuitry and is adapted to operate as a self-contained, stand alone unit by which a user may communicate with a cellular base station. Accordingly, the portable unit includes a keypad 3 which is operable to "dial" a desired telephone number and to carry out other functions conventionally performed by keypads and manually operable switches normally provided in typical cellular telephone handsets.

For illustrative purposes, portable unit 1 is shown with a display 4, conventional to cellular telephone apparatus, and a low gain antenna 11. The antenna permits RF communication in an analog mode between the portable unit and a cellular base station. The portable unit also includes a microphone 40, to convert audible speech signals into electrical voice signals for transmission from the portable unit to the cellular base station, and a speaker 45 to convert electrical voice signals which are received from a cellular base station into audible sounds that are perceived by the user.

Thus, by operating keypad 3, speaking into microphone 40 and listening to speaker 45, the user of portable unit 1 may communicate in an analog mode with a remote base station.

Mobile unit 5 is schematically illustrated as including an adapter 7 and a digital communications unit (DCU) 8. Adapter 7 is provided with a set of contacts 6 adapted to mate with a similar set of contacts 2 provided on portable unit 1. As will be described below in connection with FIG. 3, when mobile unit 5 receives portable unit 1, matching contacts 2 and 6 enable the power supply normally used to energize the mobile unit now to power the portable unit. For example, a vehicle battery 9 to which mobile unit 5 is connected may be used to supply power to portable unit 1. Adapter 7 thus may include power supply circuitry for energizing the circuits included in the portable unit. Alternatively, adapter 7 may be configured in a shape similar to that of the battery provided in the portable unit, whereupon the user may replace that battery with the adapter when the portable unit is received by mobile unit 5. The matching contacts 2 and 6 also enable a central control unit included in mobile unit 5 to sense when the portable unit is received by the mobile unit. The functions carried out when the connection of these two units is sensed will be described below.

Digital communications unit 8 includes the digital circuitry and a microprocessor for providing digital processing of voice and data signals consistent with, for example, dual mode cellular standard TIA IS-54. As mentioned above, such signal processing is known to those of ordinary skill in the art, forms no part of the present invention per se and, in the interest of brevity, is not described further herein. To the extent that a brief description of such signal processing may be useful in appreciating the present invention, such description is provided below in conjunction with FIG. 2.

As one advantageous feature of the present invention, digital communications unit 8 is not provided with audio input or audio output circuitry. Rather, when the portable unit and the mobile unit are connected, the audio input and audio output circuitry as well as the microphone and speaker of the portable unit are used with the digital communications unit to transmit voice signals to and receive voice signals from a cellular base station in digital mode. Accordingly, suitable switching devices are provided in digital communications unit 8 as well as in portable unit 1 to facilitate the interchange of voice and data signals between these units. As will be apparent, similar switches also may be provided in adapter 7; and if desired, the switches provided in the digital communications unit, to be described, may instead be provided in the adapter.

Mobile unit 5 is coupled to a main antenna 25 from which voice signals are transmitted to and received from a cellular base station. It is appreciated that such voice signals may be transmitted either as analog signals or digital signals, compatible with the operation of the base station.

In a typical environment, mobile unit 5 is disposed in an automobile. Preferably, the automobile battery (or other local power source) is used to supply electrical energy to the mobile unit. FIG. 1 illustrates the mobile unit connected to an automobile battery 9. As will be discussed below in conjunction with FIG. 3, when portable unit 1 is received by mobile unit 5, automobile battery 9 is used to energize the electrical circuitry included in the portable unit.

In a preferred embodiment, a multi-conductor connector 42 provided with suitable plugs or other connecting devices 43 and 44 at its opposite ends serves to electrically connect portable unit 1 with mobile unit 5. The multiple conducting elements included in connector 42 provide a sufficient number of signal transmission paths between the units, as will be described. Alternatively, and in place of connector 42, contacts 2 and 6 may be provided with multiple, individual contacts to serve as the multiple signal paths between the portable and mobile units. For example, contacts 2 and 6 may be comprised of multiple pins and sockets, respectively.

Before describing portable unit 1 and mobile unit 5 in greater detail, a brief description of typical uses of these units now follows. Portable unit 1 preferably includes a battery and may be used separate and apart from mobile unit 5. In that event, connector 42 is disconnected from the portable unit and the portable unit is removed from adapter 7. The portable unit now may function as a separate, stand alone, hand-held cellular telephone device. The user may operate portable unit 1 in much the same way as typical cellular telephone devices are operated, whereby voice signals derived from microphone 40 are modulated and transmitted in analog form to a cellular base station from low gain antenna 11. Likewise, voice signals that are modulated in analog form are received from the cellular base station via antenna 11; and the modulated voice signals are demodulated and reproduced by speaker 45 as audible speech. Of course, keypad 3 may be operated to dial a desired telephone number so that the user may communicate with a desired recipient.

It will be appreciated that the signal processing, modulating and demodulating circuitry included in portable unit 1 is conventional and functions in an analog mode. Hence, voice signals are communicated in analog form between the portable unit and the cellular base station when the portable unit is used as a separate, independent, stand alone device.

When the portable unit is received by mobile unit 5, matching contacts 2 and 6 provide electrical connection between these units and, in the preferred embodiment, the power supply of the mobile unit, and particularly the energy source of the vehicle in which the mobile unit is disposed, serves to energize the circuitry included in the portable unit. For example, adapter 7 may be particularly shaped to receive the portable unit; and the proper positioning of the portable unit within the adapter facilitates the connection of contacts 2 and 6. In addition, connector 42 is coupled between the portable and mobile units, for example, by inserting plugs 43 and 44 in suitable sockets provided in the portable and mobile units, respectively. Alternatively, contacts 2 and 6 may include a multiple pin/socket connector to establish multiple signal paths between the portable and mobile units when portable unit 1 is received by mobile unit 5. Preferably, however, the portable and mobile units are interconnected by means of connector 42 to enable the user to remove the portable unit from adapter 7 and use the handset thereof in much the same way as a telephone is used to communicate with a cellular base station. Once the portable and mobile units are connected, voice signals derived from the portable unit are transmitted via mobile unit 5 to main antenna 25 and, similarly, voice signals which are received from the cellular base station are received at main antenna 25 and supplied to portable unit 1 via the mobile unit.

In the preferred embodiment, it is not necessary to provide mobile unit 5 with analog modulating-/demodulating circuitry. Rather, it is sufficient merely for digital communications unit 8 to operate in a digital mode for the transmission and reception of voice signals. As will be described below, in the event that mobile station 10 (which now is comprised of interconnected portable unit 1 and mobile unit 5) communicates with a cellular base station exhibiting only analog transmission/reception capabilities, as may be the case if the cellular base station is located in suburban and exurban environments, voice signals derived from microphone 40 are modulated by the analog modulator included in portable unit 1; and these analog voice signals are coupled via connector 42 to mobile unit 5 whereat they are RF modulated and transmitted by main antenna 25. The usual RF circuitry and low gain antenna 11 included in portable unit 1 are bypassed when the portable and mobile units are connected. Similarly, when voice signals are transmitted from a cellular base station by analog modulation, those analog modulated voice signals are received by main antenna 25, RF demodulated by an RF receiver circuit included in mobile unit 5 and coupled to portable unit 1 whereat the demodulated analog voice signals are subjected to analog demodulation. The resultant demodulated voice signals are converted to audible sounds by speaker 45.

However, if mobile station 10 communicates with a cellular base station having digital capabilities; and if such communication is by way of digital modulation, such as in accordance with the dual mode cellular standard TIA IS-54, the analog modulating/demodulating circuitry included in portable unit 1 is bypassed and the digital modulating circuitry included in, for example, digital communications unit 8 is utilized. Now, voice signals derived from microphone 40 in portable unit 1 are coupled to mobile unit 5 whereat they are converted to digital signals, encoded, processed and modulated (such as by $\pi/4$ shifted, differentially encoded quadrature phase shift keying); and the resultant digital voice signals are RF modulated by an RF transmit circuit and supplied to main antenna 25 for transmission to the cellular base station. Similarly, digital voice signals that are received from the cellular base station are supplied by main antenna 25 to the RF receiver circuit included in mobile unit 5 to provide RF demodulation of the digital voice signals. The resultant digital signals then are processed, error corrected, decoded and converted to analog signals by digital communication unit 8. These analog voice signals then are coupled to portable unit 1 and converted to audible sounds by speaker 45.

Figure 2:
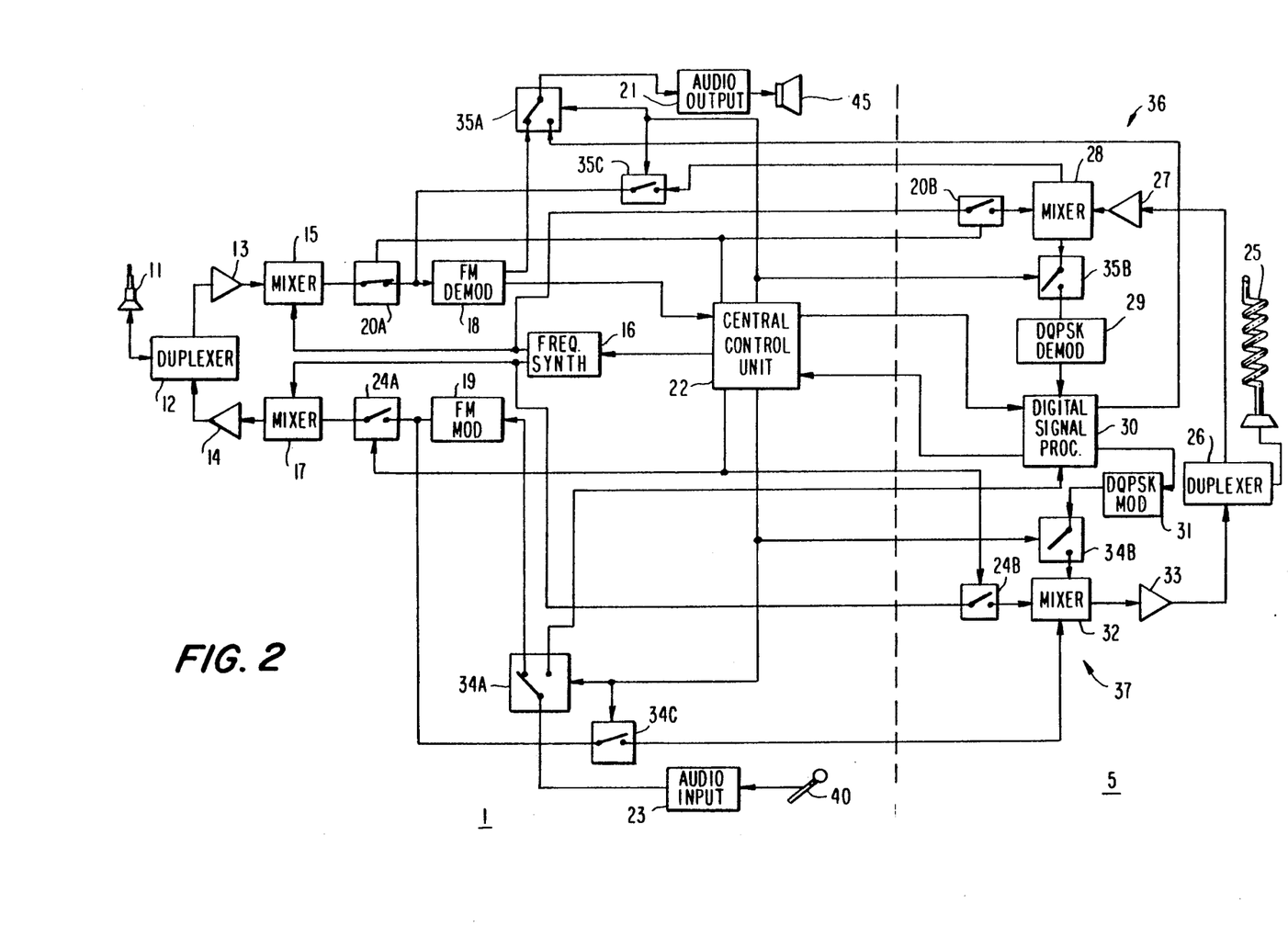
FIG. 2 is a block diagram of portions of the portable analog unit and the mobile unit connectable therewith, in accordance with the present invention.

FIG. 2 is a block diagram of one embodiment of the relevant portion of the electronics included in portable unit 1 and mobile unit 5, and the electrical interconnection of these units. For convenience, those elements which are disposed in portable unit 1 are illustrated to the left of the vertical broken line in FIG. 2; and those elements which are included in mobile unit 5 are illustrated to the right of this line. It will, nevertheless, be appreciated that various switches which are illustrated as being disposed in one unit may, alternatively, be disposed in the other.

As shown, portable unit 1 is comprised of a duplexer 12, signal receiving circuitry including an RF mixer 15, an analog demodulator 18 and audio output circuitry 21, and signal transmitting circuitry including audio input circuitry 23, an analog modulator 19 and an RF mixer 17. Duplexer 12 is adapted to operate in a receive or transmit mode and is coupled to low gain antenna 11 to receive analog voice signals from a cellular base station and to transmit analog voice signals to that cellular base station. The duplexer is coupled to both the signal receiving circuitry and the signal transmitting circuitry. A filter amplifier 13 couples duplexer 12 to RF mixer 14 to supply RF analog voice signals to the mixer.

Mixer 15 is adapted to RF demodulate the analog voice signals and, in this respect, a local oscillator 16, preferably formed as a frequency synthesizer, supplies to the mixer a local oscillating signal of a frequency corresponding to a desired cellular channel. For example, voice signals may be transmitted in either analog or digital form from a cellular base station with an RF frequency in the range of 869 MHz to 894 MHz. Frequency synthesizer 16 supplies an appropriate RF oscillating signal to mixer 15 under the control of a central control unit 22 (to be described) so as to recover the voice signals from the channel transmitted by the cellular base station.

Mixer 15 is coupled to analog demodulator 18 via a receiver switch 20. Typically, frequency modulation (FM) is used in the analog modulating mode and, therefore, analog demodulator 18 is comprised of an FM demodulator. The FM demodulator is provided with voice and control outputs, the control output being coupled to central control unit 22 and the voice output being coupled to audio output circuit 21 by way of a mode switch 35A. As will be described below, mode switch 35A is used to couple to the audio output circuitry demodulated voice signals that had been transmitted to either the analog mode or the digital mode. Hence, for convenience, this switch is referred to as a mode switch, indicative of its use to couple voice signals that have been transmitted in the analog mode or in the digital mode.

The control output of FM modulator 18 recovers control data from the signals transmitted by the cellular base station, such as a voice channel assignment signal. The remaining control signals are not relevant to the present invention per se. It will be appreciated that central control unit 22 responds to the voice channel assignment signal to determine the particular mixing frequency to be produced by frequency synthesizer 16.

Central control unit 22 preferably includes a conventional microprocessor whose functions relevant to the instant invention may be summarized as follows:

The central control unit determines the particular mixing frequency produced by frequency synthesizer 16 in response to the voice channel assignment signal that is received from the cellular base station.

The central control unit detects when portable unit 1 is connected to mobile unit 5 (as when the mobile unit receives the portable unit, as mentioned above) to produce a portable/base selector signal. This selector signal is coupled to receiver switches 20A and 20B and to transmit switches 24A and 24B whose functions are described below. Suffice it to say that these switches exhibit a first state when the portable unit is used as a stand alone unit and a second state when the portable unit is connected to the mobile unit. When in this second state, the RF receiver circuit included in the mobile unit is used to couple voice signals received from the cellular base station to FM demodulator 18.

The central control unit 22 senses when voice signals are communicated with the cellular base station in analog or digital form. When analog transmission is used, the central control unit supplies an "analog" mode signal to mode switches 35A, 35B and 35C and to mode switches 34A, 34B and 34C, to be described. Conversely, when digital transmission is selected, the central control unit supplies a "digital" mode signal to these mode switches.

In the illustrated embodiment, mode switch 35A exhibits two states: an analog mode state in which the output of FM demodulator 18 is coupled to audio output circuitry 21 and a digital mode state in which the output of a digital signal processor 30 (to be described) is coupled to the audio output circuitry. It is appreciated that mode switch 35A, as well as the other switches illustrated in FIG. 2, may be implemented as conventional solid-state switching devices.

Audio output circuitry 21 includes equalizing, filtering, noise reduction and amplifying circuitry conventionally used and known to those of ordinary skill in the art.

In the transmitting circuitry, audio input circuitry 23 is coupled to microphone 40 to receive voice signals therefrom. The audio input circuitry is adapted to filter, equalize and amplify the voice signals in a manner known to those of ordinary skill in the art. The resultant voice signals produced by the audio input circuitry are coupled by mode switch 34A to analog modulator 19 when this mode switch is in its analog mode. However, when mode switch 34A is in its digital mode, it couples the voice signals to digital signal processor 30.

Analog modulator 19 is compatible with analog demodulator 18 and, in the illustrated embodiment, comprises an FM modulator. The frequency modulated voice signals produced thereby are coupled to mixer 17 by transmit switch 24A. In the embodiment described herein, transmit switch 24A assumes a first state to couple frequency modulated voice signals from the FM modulator to mixer 17 when portable unit 1 is used as a stand alone device. However, when the portable unit is connected to mobile unit 5, central control unit 22 disposes transmit switch 24A in a second state such that the frequency modulated voice signals are not coupled to mixer 17.

Mixer 17 is coupled to frequency synthesizer 16 and receives a mixing signal of suitable frequency therefrom. For example, voice signals may be transmitted to a cellular base station with a transmission frequency in the range of 824 MHz to 849 MHz. The frequency synthesizer supplies a mixing signal of appropriate frequency to mixer 17 as may be determined by central control unit 22 in response to the voice channel assignment signal that is received from the cellular base station. The resultant RF analog voice signals produced by mixer 17 are coupled to duplexer 12 by a power amplifier 14 and are transmitted to the cellular base station by antenna 11.

FIG. 2 illustrates the relevant portions of mobile unit 5 which is comprised of an RF receiver circuit 36, a digital demodulator 29, an RF transmit circuit 37, a digital modulator 31 and a digital signal processor 30. The RF receiver and transmit circuits 36 and 37 are coupled to main antenna 25 by a duplexer 26 which is similar to aforementioned duplexer 12 and, in the interest of brevity, is not described further herein.

RF receiver circuit 36 is comprised of a filter amplifier 27, which may be similar to filter amplifier 13, and a mixer 28 which may be similar to aforementioned mixer 15. Filter amplifier 27 is coupled to duplexer 26 and supplies to mixer 28 the RF voice signals received in analog or digital form from the cellular base station. Mixer 28 is coupled to frequency synthesizer 16 by receiver switch 20B and thus receives a mixing signal of a frequency determined by central control unit 22 in accordance with the voice channel assignment signal received from the cellular base station. It will be appreciated that receiver switches 20A and 20B cooperate such that when one is closed the other is opened.

The output of mixer 28 is coupled to FM demodulator 18 in portable unit 1 by mode switch 35C. As will be described, when mobile unit 5 operates in its analog mode, voice signals received from the cellular base station by way of main antenna 25 are RF demodulated and supplied to FM demodulator 18 for analog demodulation. It is seen that, when the portable and mobile units are connected and voice signals are communicated in the analog mode, FM demodulator 18 receives frequency modulated voice signals from mixer 28 in place of frequency modulated voice signals that otherwise would be supplied thereto by mixer 15. That is, the portable unit receives voice signals from the cellular base station by way of mobile unit 5.

The output of mixer 28 also is coupled to digital demodulator 29 by way of mode switch 35B. Although FIG. 2 illustrates mixer 28 with two separate outputs, this has been shown simply for convenience; and it will be appreciated that the mixer is provided with one output coupled to mode switches 35B and 35C. These mode switches are controlled by the analog/digital mode signal produced by central control unit 22; and mode switch 35C normally is closed (corresponding to a first state) when mobile unit 5 operates in its analog mode, and mode switch 35B is closed (corresponding to a second state) when a digital traffic channel is assigned to mobile station 10. It will be appreciated that, when switch 35C is closed, switch 35B is opened and, conversely, when switch 35C is opened, switch 35B is closed.

Consistent with dual mode cellular standard TIA IS-54, digital demodulator 29 operates as a $\pi/4$ shifted, differentially encoded quadrature phase shift keying demodulator. The output of this DQPSK demodulator comprises a digitally encoded voice signal which is supplied to digital signal processor 30. The digital signal processor is adapted to decode the voice signal, provide error correction therefor and convert the decoded, corrected voice signal to analog form. The decoded analog voice signal then is coupled to audio output circuitry 21 by mode switch 35A which, together with mode switches 35B and 35C, is controlled by the analog/digital mode signal produced by central control unit 22. The central control unit triggers mode switch 35A to couple the output of digital signal processor 30 to the audio output circuitry when a digital traffic channel has been assigned to the mobile station.

Digital signal processor 30 includes a control output coupled to central control unit 22 for supplying control signals thereto, including a voice channel assignment signal. Thus, even when voice signals are communicated in digital form, the central control unit is controlled by a voice channel assignment signal to determine the frequency of the mixing signal produced by frequency synthesizer 16 and supplied to mixers 28 and 32.

RF transmit circuit 37 is comprised of a mixer 32, similar to aforedescribed mixer 17, whose output is coupled to duplexer 26 by a power amplifier 33 which, in turn, may be similar to aforementioned power amplifier 14. Mixer 32 is adapted to mix an analog modulated voice signal or a digital modulated voice signal with a mixing signal supplied thereto from frequency synthesizer 16 via transmit switch 24B. Transmit switch 24B operates in concert with transmit switch 24A in response to the portable/base selector signal produced by central control unit 22. When portable unit 1 is not connected to mobile unit 5, transmit switch 24A admits of its first state to couple the frequency modulated voice signal produced by FM modulator 19 to mixer 17. However, when the portable and mobile units are connected, the central control unit disposes transmit switches 24A and 24B in a second state, whereby switch 24A opens, switch 24B closes and the mixing signal produced by frequency synthesizer 16 is supplied through closed switch 24B to mixer 32.

Now, the analog voice signal produced by FM modulator 19 is coupled to mixer 32 by mode switch 34C. As will be described, mode switch 34C normally is closed. However, when a digital traffic channel is assigned to mobile station 10, central control unit 22 produces a "digital" mode signal to open switch 34C and thus disconnect FM modulator 19 from mixer 32. At the same time, this "digital" mode signal closes mode switch 34B to supply a digital voice signal to the mixer. It will be appreciated, then, that mode switches 34B and 34C cooperate to exhibit a first state whereby mode switch 34C couples an analog voice signal to mixer 32, and a second state whereby mode switch 34B couples a digital voice signal to the mixer.

The digital voice signal is produced by digital signal processor 30 and a digital modulator 31. The digital signal processor is coupled to audio input circuitry 23 by way of mode switch 34A. This mode switch is similar to aforementioned mode switch 35A and, when it exhibits a first state, switch 34A couples voice signals from audio input circuitry 23 to analog modulator 19. However, when central control unit 22 disposes the mode switches in their second state, switch 34A couples the voice signals from the audio input circuitry to digital signal processor 30. The digital signal processor functions to convert the voice signals to digital form, encode those digitized voice signals and provide further processing consistent with, for example, standard TIA IS-54. Then, the processed digital voice signals are supplied to digital modulator 31 whereat they are modulated in, for example, $\pi/4$ shifted, differentially encoded quadrature phase shift keying format. The resultant digital voice signals are coupled by mode switch 34B from modulator 31 to mixer 32.

Although mixer 32 is illustrated with two voice signal inputs, this has been shown merely for convenience and simplification. It is appreciated that mode switches 34B and 34C connect the outputs of FM modulator 19 and DQPSK modulator, respectively, to the same input of mixer 32.

The manner in which mobile station 10 shown in FIG. 2 operates now will be described. Initially, let it be assumed that portable unit 1 is disconnected from mobile unit 5. Accordingly, the power source (e.g. the battery) included in the portable unit serves to energize the illustrated circuitry.

Central control unit 22 senses that the portable and mobile units are not connected and supplies a "portable" selector signal to receiver switch 20A and to transmit switch 24A. It is appreciated that since the portable and mobile units are not connected, the "portable" selector signal is not supplied to receiver switch 20B or to transmit switch 24B which, for the present embodiment, are assumed to be disposed in the mobile unit. Accordingly, switches 20A and 24A are closed (that is, they assume their first state), whereby the output of mixer 15 is coupled to the input of FM demodulator 18 and the input of mixer 17 is coupled to the output of FM modulator 19. In addition, the central control unit produces an "analog" mode signal when the portable and mobile units are not connected, thereby disposing mode switch 35A in its first state to couple the output of FM demodulator 18 to audio output circuitry 21, and to dispose mode switch 34A in its first state to couple the input of FM modulator 19 to audio input circuitry 23. At this time, mode switches 34C and 35C also may be closed; but since the portable and mobile units are not connected, the closing of these switches has no affect on the operation of portable unit 1.

In the configuration just described, analog voice signals received by antenna 11 from a cellular base station are RF demodulated by mixer 15 to recover the analog-modulated voice signals. These analog-modulated voice signals are demodulated by FM demodulator 18 and supplied to audio output circuitry 21 which drives speaker 45. Similarly, voice signals produced by audio input circuitry 23 from microphone 40 are coupled to FM modulator 19 whereat they are analog modulated; and the analog-modulated voice signals are RF modulated by mixer 17 for transmission to the cellular base station by antenna 11. Of course, the particular mixing frequencies supplied by frequency synthesizer 16 to mixers 15 and 17 are determined by central control unit 22 in response to the voice channel assignment signal received from the cellular base station and recovered by FM demodulator 18.

Thus, when portable unit 1 is disconnected from mobile unit 5 and operates as an independent, stand alone device, voice signals are communicated in analog form with a cellular base station.

Now, let it be assumed that the portable and mobile units are connected. For example, let it be assumed that the portable unit is received by adapter 7 of the mobile unit and that connector 42 electrically interconnects the portable and mobile units. When received by adapter 7, the portable unit cooperates with mobile unit 5 for hands-free operation. Of course, the provision of connector 42 permits the portable unit to be removed from the adapter and used as a handset with the mobile unit. Central control unit 22 senses the connection of the portable and mobile units to supply a "base" selector signal to receiver switch 20A and to transmit switch 24A. Consequently, these switches are opened, that is, they are disposed in their second state, to disconnect analog demodulator 18 from mixer 15 and to disconnect analog modulator 19 from mixer 17.

Since the portable and mobile units are connected, the "base" selector signal produced by central control unit 22 may be applied through, for example, connector 42 to close receiver switch 20B and transmit switch 24B. Hence, these switches are disposed in their second state. Consequently, the mixing signals produced by frequency synthesizer 16 now are supplied to mixers 28 and 32, respectively. The frequencies of the mixing signals are determined by central control unit 22 in response to the voice channel assignment signal which is received from the cellular base station and coupled to the central control unit by FM demodulator 18. As a result, RF receiver circuit 36 and RF transmit circuit 37 are tuned to particular channels for receiving voice signals from and transmitting voice signals to the cellular base station.

Let it be assumed that voice signals are communicated with the cellular base station in analog mode. For example, there may be no digital channels available or, alternatively, the cellular base station may be adapted solely for analog communication. In any event, central control unit 22 supplies an "analog" mode signal to mode switches 34A, 34C, 35A and 35C in portable unit 1 and to mode switches 34B and 35B in mobile unit 5. Now, when voice signals are received in analog form from the cellular base station, those signals are supplied from main antenna 25 through duplexer 26 and from filter amplifier 27 to mixer 28 in the mobile unit whereat the analog voice signals are RF demodulated. At this time, mode switches 35A, 35B and 35C exhibit their first state whereby the RF demodulated voice signals are coupled through switch 35C to analog demodulator 18 in the portable unit. The voice signals are recovered and supplied from demodulator 18 through switch 35A to audio output circuitry 21 which drives speaker 25 to reproduce audible speech.

When the user at mobile station 10 wishes to transmit voice signals to the cellular base station, he speaks into microphone 40 of portable unit 1 to produce electrical voice signals. These voice signals are supplied to audio input circuitry 23 which, in turn, applies voice signals through switch 34A to analog modulator 19. The voice signals are frequency modulated and coupled through switch 34C to mixer 32 in mobile unit 5, whereat the analog voice signals are RF modulated and supplied through power amplifier 33 and duplexer 26 to main antenna 25. Hence, analog voice signals are transmitted from mobile station 10 to the cellular base station. The connection of portable unit 1 with mobile unit 5 uses the analog modulator/demodulator and audio input/output circuitry of the portable unit with the RF receiver and transmit circuits of the mobile unit.

Let it be assumed that mobile station 10 is communicating with a cellular base station having digital capabilities. Let it be further assumed that a digital traffic signal is assigned to the mobile station by the cellular base station. A suitable control signal is coupled to central control unit 22 from, for example, FM demodulator 18, whereupon the central control unit applies the "digital" mode signal to mode switches 34A–34C and 35A–35C. Now, the mode switches exhibit their second state, whereupon mode switch 34A disconnects analog modulator 19 from audio input circuitry 23 and mode switch 35A disconnects analog demodulator 18 from audio output circuitry 21. In its second state, mode switch 34A couples audio input circuitry 23 to digital signal processor 30 and mode switch 35A couples the output of digital signal processor 30 to audio output circuitry 21. In addition, mode switch 34C now disconnects analog modulator 19 from mixer 32 and mode switch 35C disconnects analog demodulator 18 from mixer 28. In addition, when mode switches 34B and 35B assume their second state, they couple mixer 32 to digital modulator 31 and mixer 28 to digital demodulator 29, respectively.

In this configuration, digital voice signals that are received from the cellular base station over the digital traffic channel assigned to mobile station 10 are coupled from antenna 25 through duplexer 26 and filter amplifier 27 to mixer 28 whereat the digital voice signals are RF-demodulated. Since mode switch 35B is closed and mode switch 35C is opened, the RF-demodulated digital voice signals are coupled to the DQPSK demodulator 29 which, in turn, supplies demodulated digital voice signals to digital signal processor 30. These digital voice signals are error corrected, decoded and converted to analog form and then are supplied via mode switch 35A to audio output circuitry 21. As a result, audible speech is reproduced by speaker 45.

When the user at mobile station 10 wishes to transmit voice signals to the cellular base station, microphone 40 is used to supply electrical voice signals to audio input circuitry 23 which, in turn, couples voice signals through mode switch 34A to digital signal processor 30. The digital signal processor converts the analog voice signals to digital form and encodes the resultant digital signals. The digitized voice signals then are modulated by DQPSK modulator 31 and the modulated digital voice signals are supplied to mixer 32 by mode switch 34B. Hence, the digital voice signals are RF-modulated, supplied to duplexer 26 by power amplifier 33 and transmitted to the cellular base station by main antenna 25.

Although not described in detail herein, it will be appreciated that digital signal processor 30 performs various functions typically used to digitize and transmit voice signals, including compression, frame assembly, and the like. The particular operation of the digital signal processor forms no part of the present invention per se. Suffice it to say that the digital signal processor operates in conformity with cellular standard TIA IS-54.

Although the embodiment shown in FIG. 2 is provided with certain switches disposed in portable unit 1 and other switches disposed in mobile unit 5, it will be appreciated that the particular locations of many of these switches may be changed, if desired. For example, mode switches 34C and 35C may be disposed in mobile unit 5. Similarly, receiver switch 20B and transmit switch 24B may be disposed in portable unit 1. Still further, each of mode switches 34A and 35A may be formed as a pair of open/closed switches. For example, one of the pair comprising mode switch 34A may couple audio input circuitry 23 to analog modulator 19 and the other may couple the audio input circuitry to digital signal processor 30. Similarly, one of the pair of mode switches comprising mode switch 35A may couple audio output circuitry 21 to analog demodulator 18 and the other may couple the audio output circuitry to digital signal processor 30.

Figure 3:
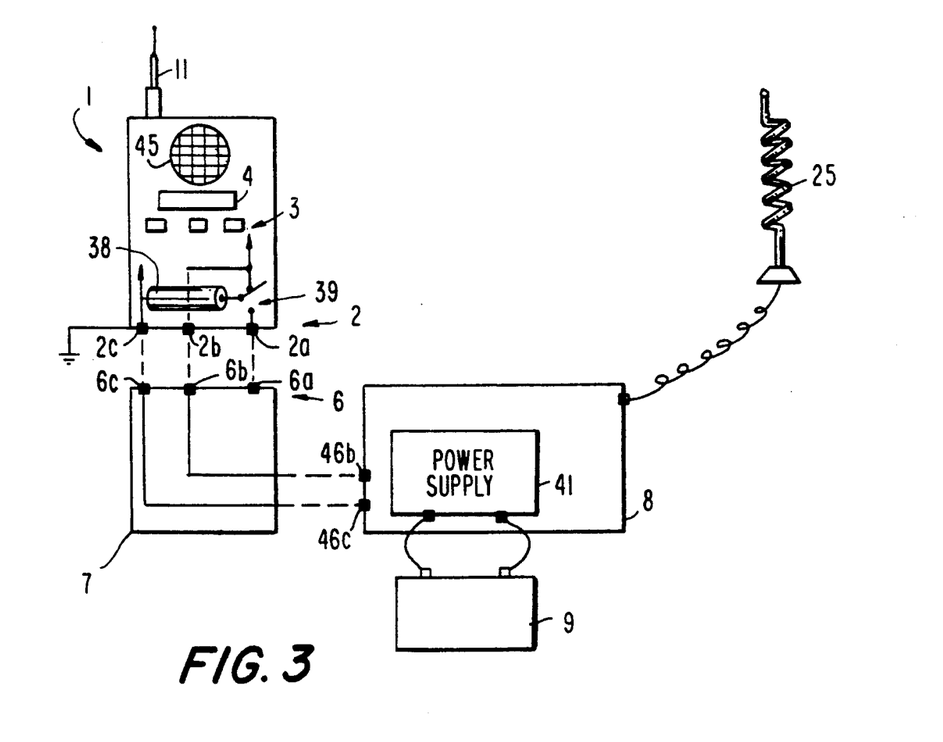
FIG. 3 is a schematic representation of the manner in which the portable unit is selectively energized when connected to and disconnected from the mobile unit.

Turning now to FIG. 3, there is illustrated one embodiment of the manner in which electrical power is supplied to the circuitry included in portable unit 1 when that unit operates as a stand alone device or when that unit is received by adapter 7 of mobile unit 5. In the interest of simplification, the multiple signal paths included in connector 42 are omitted. FIG. 3 represents matching contacts 2 and 6 which, when connected, function to supply electrical power to portable unit 1 from power source 9 included in the vehicle with which mobile station 10 is used. In this regard, the positive and negative terminals of battery 38 are connected to the electrical circuitry included in portable unit 1 so as to supply energy thereto when the portable unit is used in stand alone operation. As an example, the negative terminal of battery 38 is assumed to comprise a common terminal, such as ground. As shown, a switch 39 selectively connects the positive terminal of the battery to a power supply lead included in the portable unit. When the portable unit is received by adapter 7 of mobile unit 5, switch 39 is changed over to disconnect battery 38 from the power supply lead included in portable unit 1. This power supply lead now is connected through contacts 2b and 6b via adapter 7 to a contact 46b of digital communications unit 8 which, in turn, is supplied with electrical energy from a power supply 41 included in digital communications unit 8 of mobile unit 5. Additionally, the common or ground lead of portable unit 1 is connected through contacts 2c and 6c via adapter 7 to a contact 46c of the digital communications unit; and this contact is, in turn, supplied with a reference potential, such as ground, from the power supply.

Thus, when the portable and mobile units are connected, the power supply included in the mobile unit supplies electrical energy to the circuits of the portable unit. However, when the portable and mobile units are disconnected, as when the portable unit is used as a stand alone device, battery 38 is connected across the power supply and common leads of the electrical circuits included in the portable unit so as to supply electrical energy thereto. Switch 39 selectively connects battery 38 across the power supply and common leads in the portable unit and may be manually operated or, preferably, may be disposed in a normal condition to so connect the battery when the portable unit is used as a stand alone device, and then is changed over to disconnect the battery when the portable unit is received by adapter 7. A suitable actuator may be provided on the adapter to change over the condition of switch 39 when the adapter receives portable unit 1. Alternatively, when portable unit 1 is received by mobile unit 5, battery 38 may be removed and replaced by adapter 7 whose shape is similar to that of the battery and provides an interface with power supply 41 and with digital communications unit 8.

While the present invention has been particularly shown and described with reference to a preferred embodiment, it will be readily appreciated by those of ordinary skill in the art that various changes may be made without departing from the spirit and scope of the invention. Some of these changes have been discussed above and others will be recognized without further explanation. As additional examples of alternative implementations of the present invention, it will be recognized that an additional control unit, or microprocessor, such as an auxiliary CPU, may be disposed in mobile unit 5 to control the various transmit, receiver and mode switches in the mobile unit. Still further, some of these switches (such as the receiver and transmit switches) may be changed over by simple actuators that are mechanically triggered when the portable and mobile units are connected or disconnected. As another alternative, although FM modulation has been described as the preferred mode of analog modulation, the present invention need not be limited solely to such FM modulation. Any other form of analog modulation compatible with the format adopted by a cellular communications system may be used. Similarly, digital modulation need not be limited to DQPSK modulation. Here too, whatever standard or format is adopted by the cellular communications system with which the present invention is used will suffice as the form of digital modulation.

In the embodiments shown in FIGS. 1 and 3, an adapter provides electrical interconnection between mobile unit 1 and digital communications unit 8. It is appreciated that this adapter may be omitted if desired; and the portable unit may be connected directly to the digital communications unit. Also, the manner in which the battery included in the portable unit is selectively used when the portable unit is operated as a stand alone device is intended to be merely illustrative. Other implementations of this selective energizing operation may be adopted.

Still further, although the contemplated environment with which mobile unit 5 is used is a vehicle, it is appreciated that the presence of a vehicle is not necessary to carry out the present invention. For example, the mobile unit itself may be a portable unit having a suitable carrying case to permit an individual to carry and use it without restriction.

Therefore, it is intended that the appended claims be interpreted as covering the embodiments described herein, the variations and alternatives discussed above, such other variations and alternatives that will be recognized by those of ordinary skill in the art, and all equivalents thereto.

What is claimed is:

1. Dual mode cellular telephone apparatus for communicating in analog or digital modes, comprising:

a portable unit for communicating substantially only in an analog mode and including audio input means for supplying voice signals to be transmitted to a cellular base station, analog modulator means for modulating in analog form the voice signals received from said audio input means, transmit means for transmitting voice signals modulated in analog form, receiver means for receiving from a cellular base station voice signals modulated in analog form, analog demodulator means for demodulating analog-modulated voice signals and audio output means coupled to said analog demodulator means for recovering voice signals received from said cellular base station;

a mobile unit for communicating in both analog and digital modes with a cellular base station and connectable to said portable unit for transmitting voice signals from said portable unit to said cellular base station and for applying to said portable unit voice signals received from said cellular base station; and control means responsive to the connection of said portable unit and said mobile unit for transmitting voice signals from said audio input means to said cellular base station via said mobile unit and for coupling voice signals received from said cellular base station, in analog or digital mode as determined by said cellular base station, to said audio output means via said mobile unit, said control means being operable in said analog mode to couple the analog modulator means and the analog demodulator means of said portable unit to said mobile unit and being operable in said digital mode to couple the audio input means and the audio output means of said portable unit to said mobile unit.

2. The apparatus of claim 1 wherein said mobile unit is adapted to be disposed in a vehicle and includes electrical contacts matched with electrical contacts included in said portable unit for connecting the portable unit thereto when the mobile unit receives the portable unit.

3. The apparatus of claim 1 wherein said mobile unit includes mobile transmit means for transmitting voice signals modulated in analog or digital form; and wherein said control means includes transmit switch means having a first state when the mobile and portable units are not connected for coupling modulated voice signals produced by said analog modulator means to said transmit means of said portable unit, and having a second state when the mobile and portable units are connected for coupling modulated voice signals produced by said analog modulator means to said mobile transmit means.

4. The apparatus of claim 3 wherein said mobile unit additionally includes mobile receiver means for receiving from a cellular base station voice signals that are modulated in analog or digital form; and wherein said control means additionally includes receiver switch means having a first state when the mobile and portable units are not connected for coupling modulated voice signals received by said receiver means of the portable unit to said analog demodulator means, and having a second state when the mobile and portable units are connected for coupling modulated voice signals received by said mobile receiver means to said analog demodulator means.

5. The apparatus of claim 4 wherein said control means includes connection sensing means for sensing the connection of said mobile and portable units and for determining the states of said transmit and receiver switch means in response thereto.

6. The apparatus of claim 4 wherein said mobile unit further includes digital modulator means for modulating in digital form voice signals received from said audio input means; and wherein said control means includes mode switch means having a first state for coupling said voice signals from said audio input means to said analog modulator means and a second state for coupling said voice signals from said audio input means to said digital modulator means for transmission by said mobile transmit means.

7. The apparatus of claim 6 wherein said mobile unit also includes digital demodulator means for demodulating digital-modulated voice signals received by said mobile receiver means from a cellular base station; and wherein said control means also includes second mode switch means having a first state for coupling voice signals demodulated by the analog demodulator means of said portable unit to said audio output means and a second state for coupling voice signals received by said mobile receiver means and demodulated by said digital demodulator means to said audio output means.

8. The apparatus of claim 7 wherein said portable unit further includes tuneable local oscillating means coupled to said transmit means of the portable unit for selecting transmit channels to transmit analog-modulated voice signals; said mobile transmit means includes RF transmit means to transmit voice signals modulated in analog or digital form over selected transmit channels; and said control means further includes means for coupling the local oscillating means of said portable unit to the RF transmit means of said mobile transmit means when the mobile and portable units are connected.

9. The apparatus of claim 8 wherein said tunable local oscillating means is additionally coupled to said receiver means of the portable unit for selecting receive channels to receive analog-modulated voice signals; said mobile receiver means includes RF receive means to receive voice signals modulated in analog or digital form over selected receive channels; and said control means further includes means for coupling the local oscillating means of said portable unit to the RF receive means of said mobile receiver means when the mobile and portable units are connected.

10. The apparatus of claim 7 wherein said control means additionally includes sense means for sensing a digital control signal received by said mobile receiver means from said cellular base station to dispose the first-mentioned mode switch means and said second mode switch means in a state determined by said digital control signal.

11. The apparatus of claim 2 wherein said mobile unit includes power supply means energized by a source of electrical power in said vehicle for supplying electrical energy to said mobile unit and, when said mobile unit receives said portable unit, for supplying electrical energy to said portable unit; and wherein said portable unit includes an electrical power source connected to supply electrical energy to said portable unit and disconnected when said mobile unit receives said portable unit.

12. A cellular communications unit for communicating with a cellular base station, comprising:
 a substantially self-contained, stand alone portable unit including microphone means for converting audible sounds to voice signals to be transmitted, speaker means for converting received voice signals to audible sounds, and an antenna for transmitting and receiving voice signals;
 RF means included in said portable unit for transmitting and receiving voice signals;
 analog modulating and demodulating means included in said portable unit for respectively modulating and demodulating voice signals in analog form;
 connecting means for electrically connecting said portable unit to a mobile unit; and
 switch means for selectively coupling said analog modulating and demodulating means to said RF means in said portable unit or to said mobile unit, for selectively coupling said microphone means to said analog modulating means or to said mobile unit, and for selectively coupling said speaker means to said analog demodulating means or to said mobile unit.

13. The unit of claim 12 wherein said analog modulating and demodulating means comprises FM modulating and demodulating means.

14. The unit of claim 12 wherein said RF means comprises variable frequency means for generating signals tuned to communication channels by which said communications unit communicates with a cellular base station; and control means for selecting particular frequencies at which said signals are generated corresponding to particular communication channels.

15. The unit of claim 12 wherein said switch means comprises transmit switch means exhibiting a first state for coupling said analog modulating means to said RF means in said portable unit and a second state for coupling said analog modulating means to said mobile unit, receiver switch means exhibiting a first state for coupling said analog demodulating means to said RF means in said portable unit and a second state for coupling said analog demodulating means to said mobile unit, and control means for establishing said first or second state in response to the connection of said portable and mobile units.

16. The unit of claim 15 wherein said switch means further comprises first mode switch means exhibiting a first state for coupling said microphone means to said analog modulating means in said portable unit and a second state for coupling said microphone means to said mobile unit, and second mode switch means exhibiting a first state for coupling said speaker means to said analog demodulating means in said portable unit and a second state for coupling said speaker means to said mobile unit, said control means establishing said first or second state of said mode switch means in response to a mode control signal received from said cellular base station.

17. A mobile unit for communicating with a cellular base station, comprising:
 RF means for transmitting and receiving voice signals in analog or digital form;
 digital modulating and demodulating means for respectively modulating voice signals in digital form to be transmitted and demodulating voice signals received from said cellular base station in digital form;
 connecting means for electrically connecting said mobile unit to a portable unit of the type having analog modulating and analog demodulating means therein; and
 switch means for selectively coupling said RF means to said digital modulating and demodulating means or to the analog modulating and analog demodulating means of said portable unit.

18. The unit of claim 17 wherein said digital modulating and demodulating means comprises converting means for converting voice signals to be transmitted into digital form and for converting into analog form digital voice signals that are received, differentially encoded quadrature phase shift keying (DQPSK) modulating means for modulating digital voice signals to be transmitted, and DQPSK demodulating means for demodulating digital voice signals that are received.

19. The unit of claim 17 wherein said RF means includes mixing means for transmitting and receiving voice signals on predetermined communication channels by which said mobile unit communicates with a cellular base station; and means for receiving from said portable unit mixing signals of frequencies corresponding to said predetermined communication channels.

20. The unit of claim 17 wherein said switch means comprises first mode switch means exhibiting a first state for coupling said RF means to said digital modulating means and a second state for coupling said RF means to said portable unit; second mode switch means exhibiting a first state for coupling said RF means to said digital demodulating means and a second state for coupling said RF means to said portable unit; and control means for establishing said first or second state in response to a mode control signal received from said cellular base station.

* * * * *